United States Patent
Hunter et al.

(10) Patent No.: US 7,646,373 B2
(45) Date of Patent: Jan. 12, 2010

(54) METHODS AND SYSTEMS FOR MEASURING SPECKLE TRANSLATION WITH SPATIAL FILTERS

(75) Inventors: Susan Hunter, Fort Collins, CO (US); Charles D. Hoke, Menlo Park, CA (US); Ramakrishna Kakarala, Santa Clara, CA (US); John S. Wenstrand, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 978 days.

(21) Appl. No.: 11/016,651

(22) Filed: Dec. 17, 2004

(65) Prior Publication Data
US 2006/0132442 A1 Jun. 22, 2006

(51) Int. Cl.
*G09G 5/08* (2006.01)
*G09G 5/00* (2006.01)

(52) U.S. Cl. .................... 345/166; 345/163; 345/156

(58) Field of Classification Search ......... 345/163–167, 345/156
See application file for complete search history.

(56) References Cited

U.S. PATENT DOCUMENTS

| | | | |
|---|---|---|---|
| 5,729,009 A | 3/1998 | Dandliker et al. | |
| 6,031,218 A | 2/2000 | Piot et al. | |
| 6,225,617 B1 * | 5/2001 | Dandliker et al. | 250/208.2 |
| 6,657,184 B2 * | 12/2003 | Anderson et al. | 250/221 |
| 2004/0130532 A1 | 7/2004 | Gordon et al. | |

OTHER PUBLICATIONS

Search report from corresponding application No. PCT/US05/42237 dated Sep. 28, 2006.

* cited by examiner

*Primary Examiner*—Duc Q Dinh

(57) ABSTRACT

Two or more spatial filters are used in determining velocity based on speckle translation. A light source may be turned on, turned off, or both for a variable amount of time during operation. The velocity may then be determined with trend identification, correlation, recursive frequency estimation, or measurement bandwidth variation. A confidence level may also be calculated for the measured velocity, and the measured velocity reported or used only when the calculated confidence level meets or exceeds a given value.

11 Claims, 8 Drawing Sheets

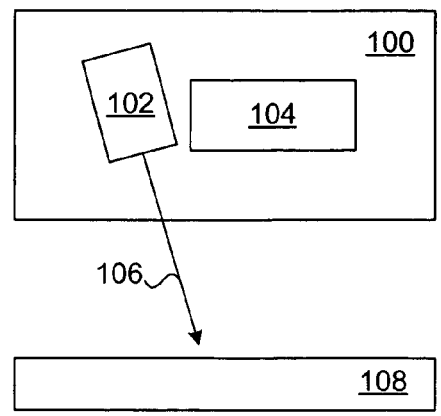
FIG. 1 – PRIOR ART
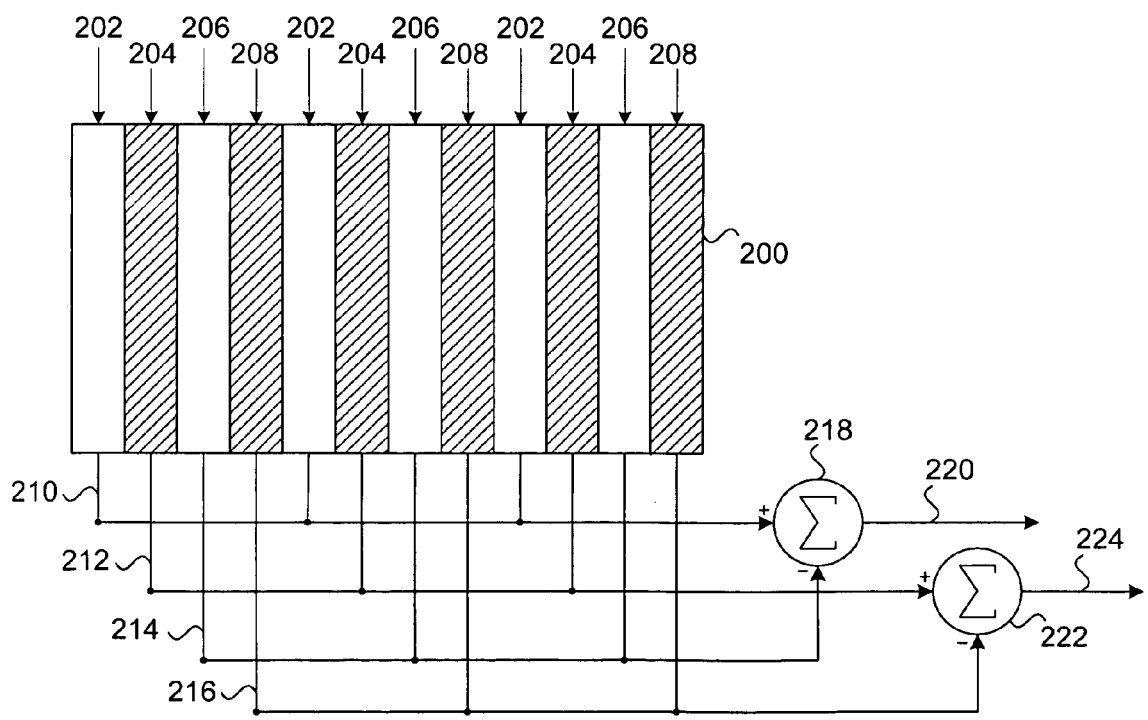
FIG. 2

METHODS AND SYSTEMS FOR MEASURING SPECKLE TRANSLATION WITH SPATIAL FILTERS

BACKGROUND

Navigational devices have been used with computers and other types of computing systems for many years. A computer mouse is one example of a navigation device. With a mechanical computer mouse, a ball rolls over a mouse pad as the mouse is moved. Interior to the mouse are wheels that contact the ball and covert its rotation into electrical signals representing orthogonal components of motion.

Another type of computer mouse is an optical mouse. FIG. 1 is a diagrammatic illustration of a portion of an optical mouse according to the prior art. Mouse 100 includes light source 102 and motion sensor 104. Light source 102 is typically implemented a light-emitting diode, which emits light 106 towards surface 108. Motion detector 104 typically includes a camera that captures images of surface 108. Motion detector 104 also includes a digital signal processor that receives and analyzes a sequence of images. Motion detector 104 determines the speed and distance mouse 100 has moved across surface 108 based on differences in the captured images.

The type and texture of surface 108 can impact how effectively motion detector 104 determines the speed and distance of mouse 100. For example, a rough or patterned surface can make it easier for motion detector 104 to determine the velocity of mouse 100, because differences in the images are more easily discernable. Other types of surfaces, such as glass surfaces, can make it more difficult for motion detector 104 to determine the velocity of mouse 100. Because glass is a transparent material, it typically does not have a sufficient amount of detectable imperfections or patterns that may be used to determine the speed and distance of navigation device 100.

SUMMARY

In accordance with the invention, methods and systems for measuring speckle translation with spatial filters are provided. Two or more spatial filters are used in determining velocity based on speckle translation. A light source may be turned on, turned off, or both for a variable amount of time during operation. The velocity may then be determined with trend identification, correlation, recursive frequency estimation, or measurement bandwidth variation. A confidence level may also be calculated for the measured velocity, and the measured velocity reported or used only when the calculated confidence level meets or exceeds a given value.

BRIEF DESCRIPTION OF THE DRAWINGS

The invention will best be understood by reference to the following detailed description of embodiments in accordance with the invention when read in conjunction with the accompanying drawings, wherein:

FIG. 1 is a diagrammatic illustration of a portion of an optical mouse according to the prior art;

FIG. 2 is a diagrammatic illustration of a spatial filter in an embodiment in accordance with the invention;

DETAILED DESCRIPTION

Figure 3:
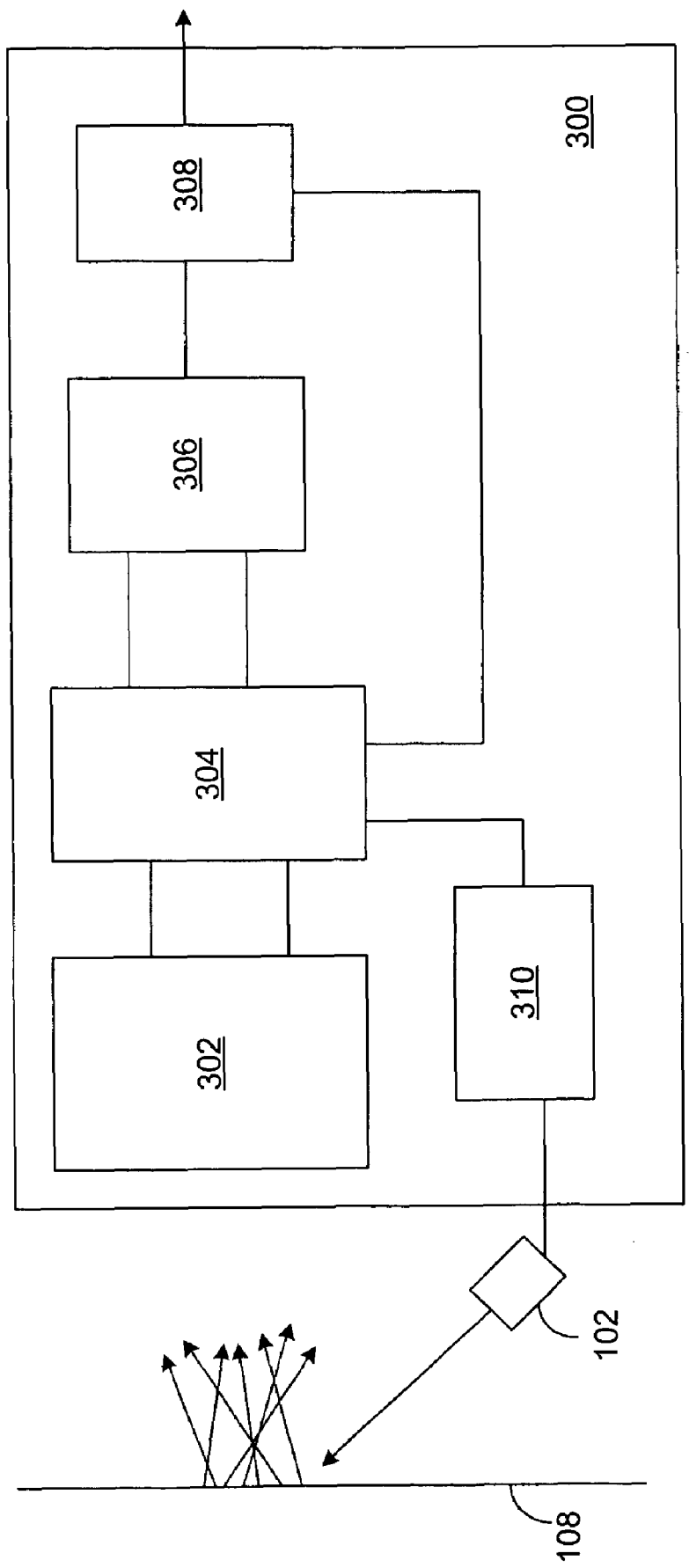
FIG. 3 is a block diagram of a portion of an optical navigation device in an embodiment in accordance with the invention.

The following description is presented to enable one skilled in the art to make and use embodiments in accordance with the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

With reference to the figures and in particular with reference to FIG. 2, there is shown a diagrammatic illustration of a spatial filter in an embodiment in accordance with the invention. Spatial filter 200 includes a repeating pattern of photodetectors 202, 204, 206, 208 that generate individual signals on signal lines 210, 212, 214, 216, respectively. Individual signals 210, 214 are summed 218 to create signal 220. Signals 212, 216 are summed 222 to create signal 224. Signal 220 is typically known as the in-phase (I) channel or the cosine channel, while signal 224 as the quadrature (Q) channel or the sine channel.

The spatial filter shown in FIG. 2 may be used in the systems and methods described herein. Embodiments in accordance with the invention, however, are not limited to the spatial filter design of FIG. 2. Other types of spatial filters may be used, such as, for example, a liquid crystal cell array, photodiode array, lenticular grating, cylinder array, transmission grating, or a prism grating.

FIG. 3 is a block diagram of a portion of an optical navigation device in an embodiment in accordance with the invention. Only the elements needed to describe the invention are illustrated in FIG. 3. Light source 102 emits light towards surface 108, which is a desktop or other suitable navigation surface. As optical navigation device 300 moves over surface 108, the scattered light creates speckle patterns that are detected with spatial filter 302. Spatial filter 302 may include any number of spatial filters.

The I and Q channels output from spatial filter 302 are input into optional capture and control unit 304, which stores an electrical charge for each signal. In one embodiment in accordance with the invention, capture and control unit 304 includes an electronic shutter connected to several sense capacitors (not shown). When the electronic shutter is open, charge accumulates on the sense capacitors. When the electronic shutter is closed, charge does not accumulate on the sense capacitors or is lost from the sense capacitors.

A multiplexer (not shown) is connected to each sense capacitor and transmits the charge accumulated on each capacitor to velocity measurement unit 306. Velocity measurement unit 306 determines the motion or velocity of mouse 300. Velocity measurement unit 306 is described in more detail in conjunction with FIGS. 4-9.

Signals output from velocity measurement unit 306 may be received by optional analysis unit 308. Analysis unit 308 receives the signals from velocity measurement unit 306 and, when appropriate, outputs one or more velocity measurements for optical navigation device 300. Analysis unit 308 is described in more detail in conjunction with FIGS. 9-10.

Capture and control unit 304 also controls light controller 310, which provides power to light source 102 to turn light source on and off. Light controller 310 may also vary the intensity of light source 102 as well as the amount of time light source 102 is on, off, or both. Techniques for controlling light source 102 are described in more detail in conjunction with FIGS. 11A-11D and FIG. 12.

Figure 4:
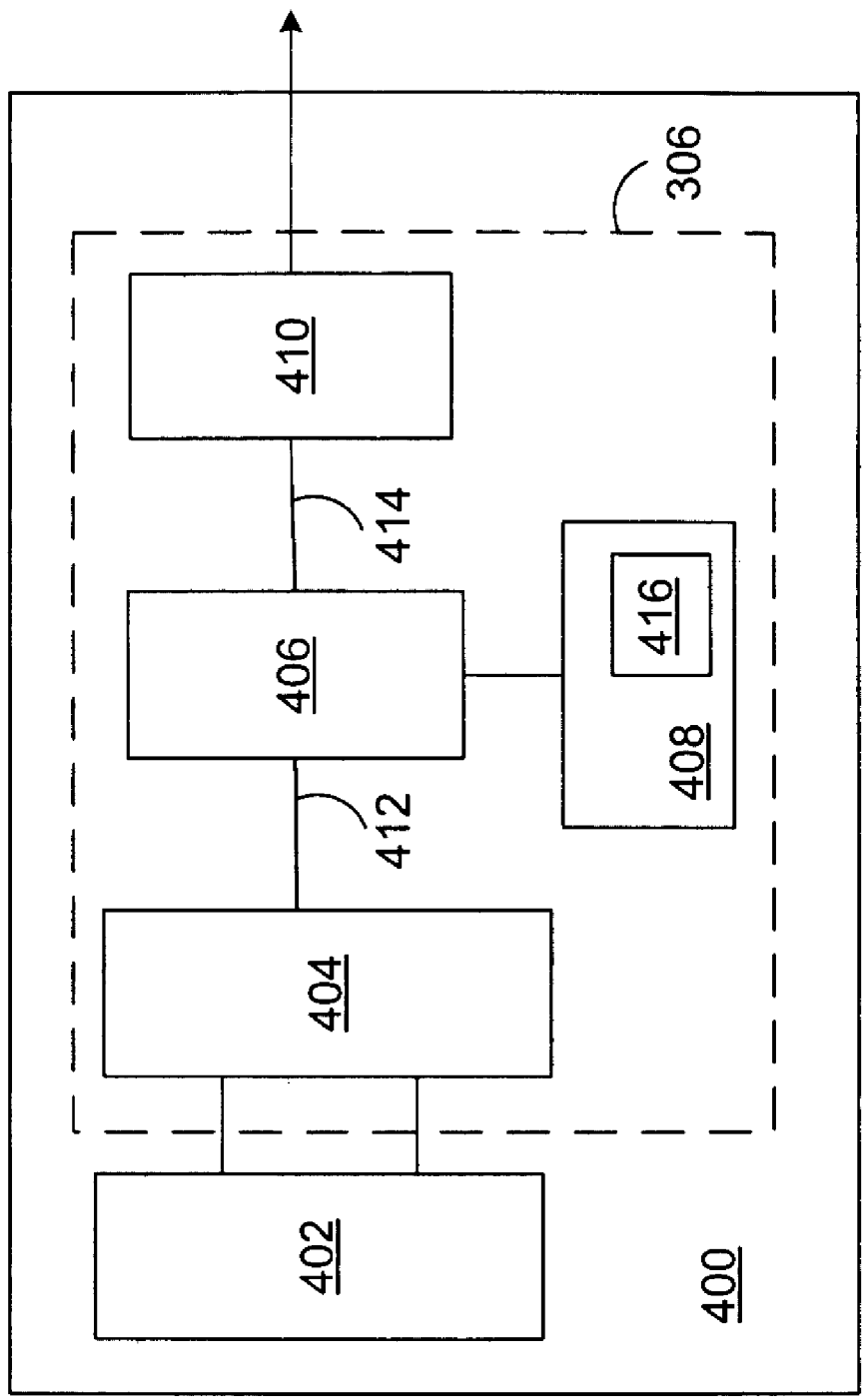
FIG. 4 is a more detailed block diagram of optical navigation device 300 of FIG. 3 in a first embodiment in accordance with the invention.

Referring to FIG. 4, there is shown a more detailed block diagram of optical navigation device 300 of FIG. 3 in a first embodiment in accordance with the invention. Optical navigation device 400 includes spatial filter 402, phase quadrature decoder (PQD) 404, buffer 406, controller 408, and measurement circuit 410. Spatial filter 402 may include any number of spatial filters.

The I and Q channels output from spatial filter 402 are input into PQD 404. PQD 404 generates a pulse every time a transition is made in either the forward (+) or backward (−) direction. It is assumed in one embodiment in accordance with the invention that the transitions move in a clockwise or counter-clockwise direction. Any transitions contrary to this assumption are then ignored. This assumption may be used to reduce spurious noise when determining velocity.

The pulses output from PQD 404 are transmitted to buffer 406 via line 412. Controller 408 analyzes the pulses in buffer 406 to determination if there is a trend in the pulses. A trend occurs when a pre-determined number of similarly signed pulses ("+" or "−") are output from PQD 404. In an embodiment in accordance with the invention, the pre-determined number of similarly signed pulses ranges from three to ten.

The factors that affect the pre-determined number similarly signed pulses that constitute a trend can include: the system and application, the complexity of processing the pulses, and the need to reduce the amount of spurious data input into measurement circuit 410. For example, when the optical devices in optical navigation device 400 are manufactured and aligned pursuant to tighter optical tolerances, less data may be required to determine the velocity. However, increasing the quality and alignment requirements typically increases the cost of optical navigation device 400 because more resources are typically required to design and construct optical navigation device 400.

Another factor is the size of buffer 406, which determines the number of pulses that may be stored. But as the number of stored pulses increases, so does the complexity of processing the pulses because more pulses are analyzed and processed. Increased complexity typically results in increased design and construction costs for optical navigation device 400.

If controller 408 detects a trend in the pulses, one or more pulses are transmitted to measurement circuit 410 via line 414. The velocity is then calculated by measurement circuit 410 and transmitted to a computing device (not shown). In one embodiment in accordance with the invention, measurement circuit 410 calculates the speed as inversely proportional to the average time between the successive or consistent output pulses of PQD 404 and determines the direction of motion which is given by the sign of the pulses.

In one embodiment in accordance with the invention, controller 408 stores one or more rules in memory 416. A rule defines adjustments or control parameters for the buffered pulses. Rules are designed to optimize the data output from PQD 404. When determining whether a trend in the pulses is present, controller 408 may apply one or more rules to the pulses stored in buffer 406 in some embodiments in accordance with the invention.

Figure 5:
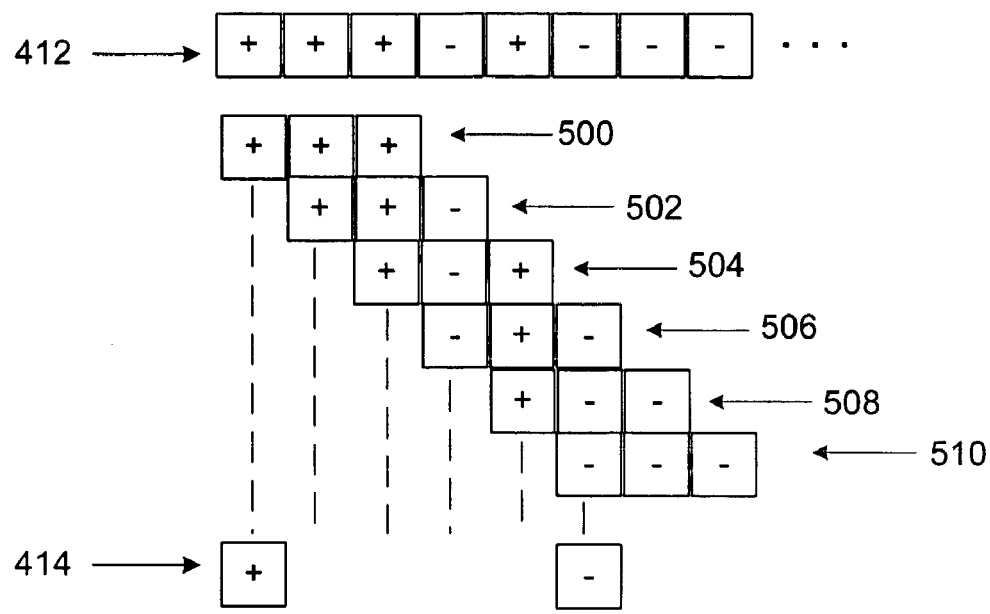
FIG. 5 is a graphical illustration of a first analysis performed by the controller of FIG. 4.

FIG. 5 is a graphical illustration of a first analysis performed by the controller of FIG. 4. The analysis includes the application of a rule to the pulses stored in buffer 406. The rule divides the buffered pulses into groups and allows a pulse to be output from buffer 406 only when the signs of the pulses in a group are the same. When all of the pulses in a group do not have the same sign, buffer 406 does not output any data.

The sign of the pulses output from PQD 404 on line 412 are illustrated in FIG. 5 as "+++−+−−−". A trend is found in this example when three similarly signed pulses are detected, so the pulses are shown in groups of three. The pulses in group 500 all have a "+" sign, so a pulse with a "+" sign is transmitted on line 414. The pulses in group 502 have the signs "++−". Because group 502 does not have three similarly signed pulses, buffer 406 does not output a pulse on line 414.

Groups 504, 506, 508 also do not have three similarly signed pulses, so buffer 406 does not output a pulse on line 414. The pulses in group 510, however, have the signs "−−−". Buffer 406 therefore outputs a pulse having a "−" sign on line 414.

Figure 6:
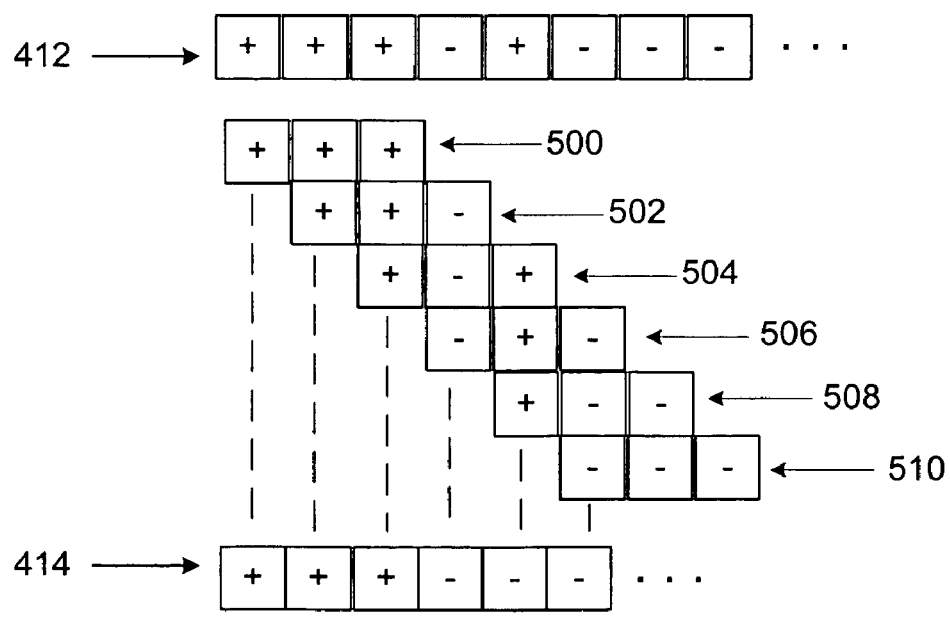
FIG. 6 is a graphical illustration of a second analysis performed by the controller of FIG. 4.

FIG. 6 is a graphical illustration of a second analysis performed by the controller of FIG. 4. The analysis includes the application of a different rule to the pulses stored in buffer 406. The rule divides the buffered pulses into groups and changes the sign of one or more pulses when all of the pulses in a group do not have the same sign. A pulse is then output from buffer 414 based on the adjustment.

The pulses in group 500 all have a "+" sign, so a pulse with a "+" sign is transmitted on line 414. The pulses in the group 502 have the signs "++−". Using the rule described above, controller 408 modifies the signs in group 502 to "+++", and a pulse with a "+" sign is output on line 414.

The pulses in the group 504 have the signs "+−+", so controller 408 modifies the signs to "+++" and a pulse with a "+" sign is output on line 414. The pulses in the group 506 have the signs "−+−", so the signs are modified to "−−−" and a pulse with a "−" sign is output on line 414. The pulses in the group 508 have the signs "+−−", so controller 408 modifies the signs to "−−−" and a pulse with a "−" sign is output on line 414. And finally, the pulses in group 510 all have a "−" sign, so a pulse with a "−" sign is transmitted on line 414. Although FIGS. 5 and 6 are described with reference to one rule, embodiments in accordance with the invention may apply any desired number and type of rules to buffer 406.

Figure 7:
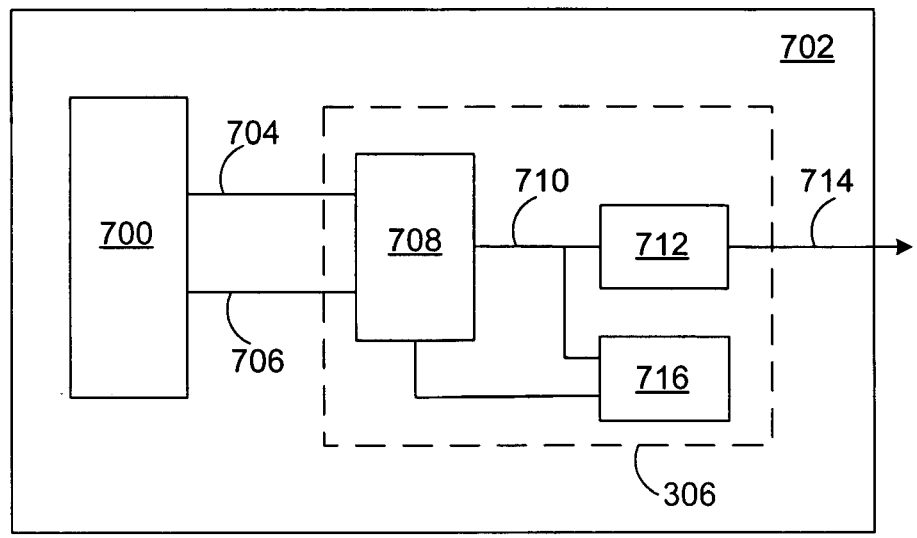
FIG. 7 is a more detailed block diagram of optical navigation device 300 of FIG. 3 in a second embodiment in accordance with the invention.

Referring now to FIG. 7, there is shown a more detailed block diagram of optical navigation device 300 of FIG. 3 in a second embodiment in accordance with the invention. Spatial filter 700 in optical navigation device 702 generates the I and Q channels on lines 704, 706. The I and Q channels are then input into correlator 708, which correlates the two signals as a function of time. Correlator 708 produces a signal on line 710 that corresponds to the correlated I and Q signals as a function of both positive and negative shifts in time. Because the I and Q channels have a similar fundamental frequency (F), the correlation peak will occur at either the $+\Delta T$ or $-\Delta T$ position where $\pm\Delta T = \pm 1/4F$.

Peak detector 712 receives the correlated signal on line 710 and generates an output signal on line 714. The correlated signal 710 is also input into controller 716, which shifts one of the signals in correlator 708 in a particular direction relative to the other signal. A signal is shifted in the forward direction and in the backward direction in an embodiment in accordance with the invention. The sign of the shift provides the direction of the motion for the optical navigation device and the correlation distance between the two signals is inversely proportional to the speed of the motion.

Figure 8:
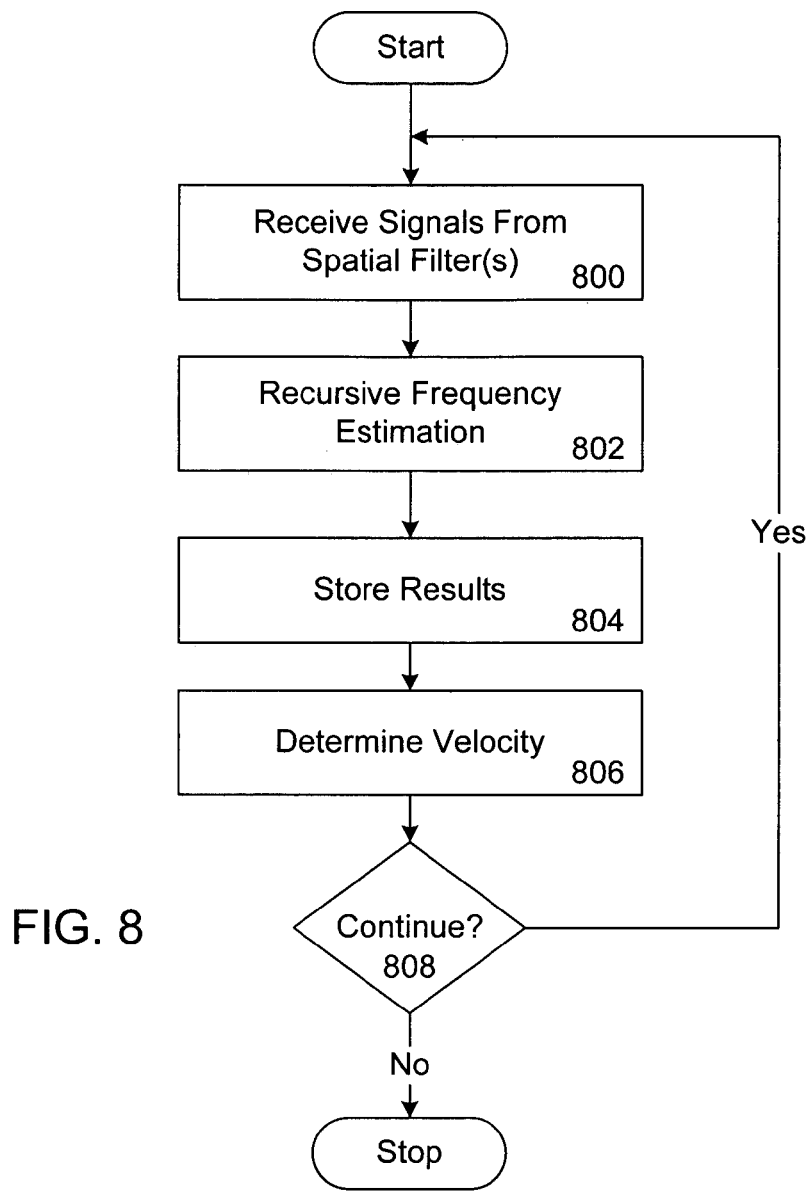
FIG. 8 shows a flowchart of a method for measuring velocity that is implemented in the velocity measurement unit of FIG. 3 in a third embodiment in accordance with the invention.

FIG. 8 shows a flowchart of a method for measuring velocity that is implemented in the velocity measurement unit of FIG. 3 in a third embodiment in accordance with the invention. Initially, the signals output from one or more spatial filters are received, as shown in block 800. A recursive frequency estimation operation is then performed on the signals. This step is illustrated in block 802.

In an embodiment in accordance with the invention, the recursive frequency estimation begins by representing each of the I and Q channels as a complex number at time n by x[n]. Assuming $x[n]=Ae^{jwn}$, where $j=\sqrt{-1}$, x[n] may then be rewritten as $x[n]=e^{jw}x[n-1]$. The parameter $W_{est}$ is selected to minimize the result from the equation for the sum of the squared errors, $$se = \sum_{n=1}^{N} |x[n] - e^{jw_{est}} x[n-1]|^2.$$

By differentiating the equation, the estimate becomes $w_{est}=\text{phase}(A[N]/B[N])$ where $$B[N] = \sum_{n=0}^{N-1} |x[n]|^2 \text{ and } A[N] = \sum_{n=1}^{N} x[n]\bar{x}[n-1],$$

where $\bar{x}$=complex conjugate of x. B and A are then recursively estimated as $A[N]=\lambda A[N-1]+(1-\lambda)x[N]\bar{x}[N-1]$ and $B[N]=\lambda B[N-1]+(1-\lambda)|x[N-1]|^2$, where the value of lambda ($\lambda$) ranges between zero and one. For example, $\lambda$ ranges between 0.75 and 0.99 in an embodiment in accordance with the invention.

The results of the recursive frequency estimation (A[N−1] and B[N−1]) are then stored in a memory, as shown in block 804. The velocity is then determined at block 806 and a determination is made as to whether the process should continue (block 808). If the process should continue, the method returns to block 800 and repeats until it is no longer desirable or necessary to continue.

Figure 9:
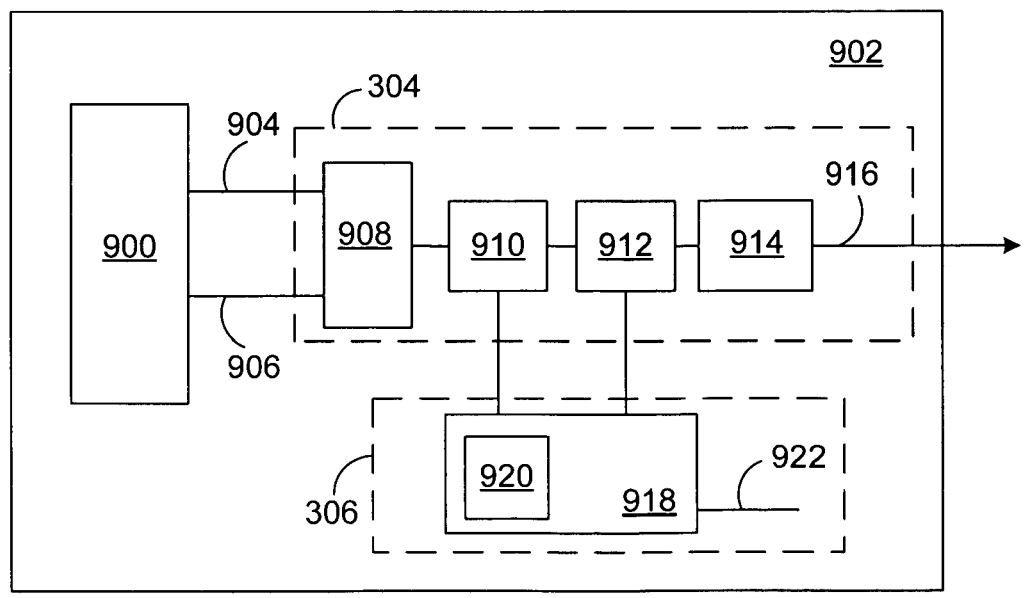
FIG. 9 is a more detailed block diagram of optical navigation device 300 of FIG. 3 in a fourth embodiment in accordance with the invention.

Referring to FIG. 9, there is shown a more detailed block diagram of optical navigation device 300 of FIG. 3 in a fourth embodiment in accordance with the invention. Spatial filter 900 in optical navigation device 902 generates the I and Q channels on lines 904, 906. Spatial filter 900 includes any desired number of spatial filters.

Charge accumulator 908 receives the I and Q signals and stores an electrical charge for each signal. Integrator 910 integrates the stored signals and inputs the integrated signals into amplifier 912. The output of amplifier 912 is then input into analog-to-digital converter (ADC) 914. ADC 914 generates a digital output on line 916 corresponding to the voltage level output from amplifier 912.

Controller 918 also receives the output from amplifier 912 and compares the frequency of the output signal with an expected frequency. In one embodiment in accordance with the invention, one or more expected frequencies are stored in memory 920. In another embodiment in accordance with the invention, the expected frequency or frequencies are input into controller 918 via signal line 922. Based on the comparison of each output frequency with a corresponding expected frequency, controller 918 adjusts the clock rate for integrator 910, which increases or decreases the measurement bandwidth of integrator 910 and possibly the gain value.

Adjusting the measurement bandwidth allows optical navigation device 902 to relate the measurement bandwidth to its velocity. For example, the measurement bandwidth may be adjusted to a lower value when optical navigation device 902 is moving slowly. This provides integrator 910 with more charge because the integration time of integrator 910 is increased. The measurement bandwidth can then be adjusted to a higher value when optical navigation device 902 is moving faster.

A technique for implementing a velocity-based variable frame rate is disclosed in commonly assigned U.S. Patent Application Publication US 2004/0130532 A1, published on Jul. 8, 2004 and incorporated herein by reference. A disclosed embodiment includes a shutter controller connected between charge accumulator 908 and controller 918. The shutter controller receives the output from ADC 914 and checks the values of the digital data (e.g., one to eight bits) to determine whether there are too many minimum values or too many maximum values. If there are too many minimum values, controller 918 increases the charge accumulation time or the intensity of the light source. If there are too many maximum values, controller 918 decreases the charge accumulation time or the intensity of the light source.

Figure 10:
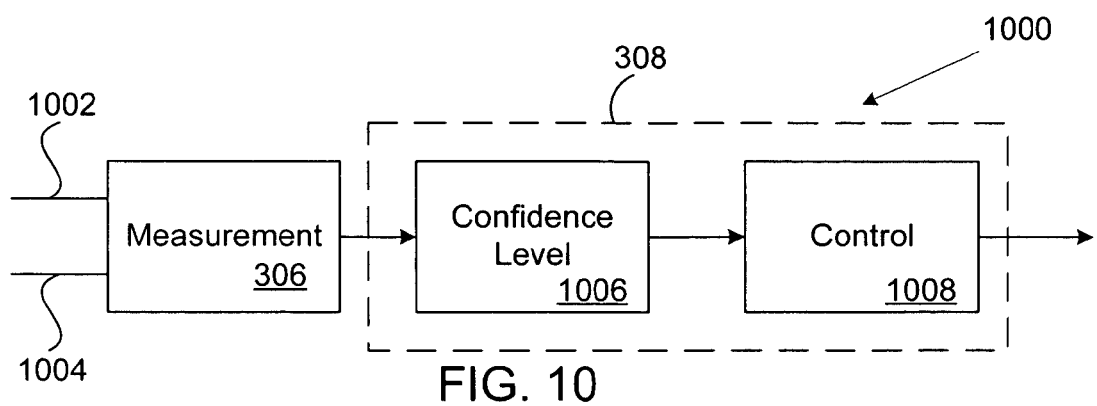
FIG. 10 is a data flow diagram in an embodiment in accordance with the invention.

FIG. 10 is a data flow diagram in an embodiment in accordance with the invention. Data flow 1000 begins by inputting the I and Q channels on lines 1002, 1004 into measurement 306. Measurement 306 measures the translation to determine velocity. Next, at block 1006, a confidence level for the determined velocity is determined. When the confidence level meets or exceeds a given value, the measurements are used by control 1008.

The confidence level may be computed using one of several techniques. An embodiment in accordance with the invention determines the probability of a new measurement based on the previous measurement. The method can also consider how the human body functions and changes its motion. Another embodiment may use a noise estimation algorithm to compute a confidence level. Yet another embodiment in accordance with the invention may calculate a confidence level by determining the deviation of the recent measurements from expected or previous measurements. And in yet another embodiment a combination of the techniques is used to compute the confidence level.

Figure 11A:
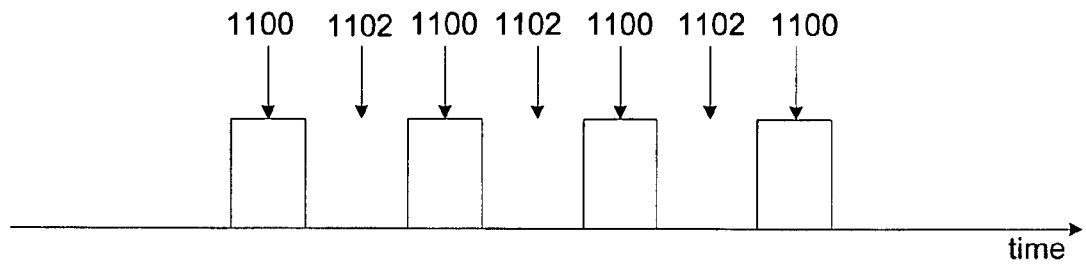
FIGS. 11A-11D are timing diagrams illustrating illumination schemes in embodiments in accordance with the invention.

FIGS. 11A-11D are timing diagrams illustrating illumination schemes in embodiments in accordance with the invention. FIG. 11A illustrates non-continuous periodic illumination 1100, where the illumination is "on" for a period of time. The illumination is "off" during the non-illumination periods 1102, which occur in between illumination times 1100. The "on" and "off" periods are equal in the embodiment of FIG. 11A.

Figure 11B:
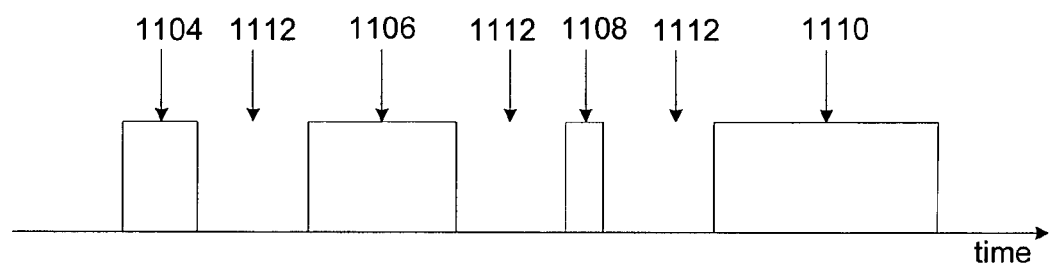

FIG. 11B depicts one semi-periodic non-continuous illumination scheme. The amount of time the illumination is "on" can vary each time the illumination is on, as shown by illumination periods 1104, 1106, 1108, 1110. Thus, the illumination can remain "on" until an acceptable measurement of velocity is determined. Unlike the illumination times, the non-illumination times 1112 are equal in the embodiment of FIG. 11B.

Figure 11C:
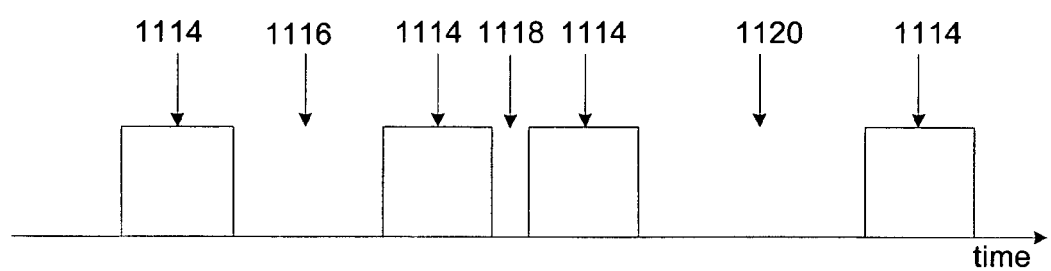
Figure 11D:
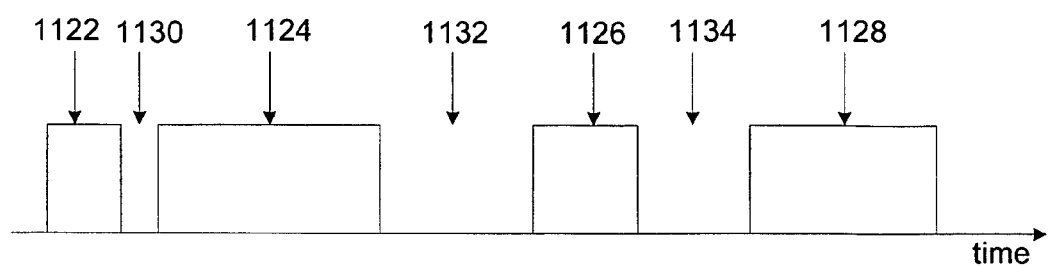

FIG. 11C illustrates another semi-periodic non-continuous illumination scheme. Illumination times 1114 are equal while the non-illumination times 1116, 1118, 1120 are not equal in the embodiment of FIG. 11C. FIG. 11D depicts a non-periodic non-continuous illumination scheme. Illumination periods 1122, 1124, 1126, 1128 and non-illumination periods 1130, 1132, 1134 are not equal in the embodiment of FIG. 11D. Thus, the illumination is "on" for a variable amount of time and "off" for variable amount of time.

One or more factors may be considered when determining each variable illumination and non-illumination interval of time. For example, an interval may be based on a current measurement, the confidence level of a current measurement, the present motion of the optical navigation device, or on a power saving mode that reduces power consumption by decreasing the duty cycle of the light source. In an embodiment in accordance with the invention, velocity measurements during non-illumination intervals or during drop-outs are estimated by interpolation. In other embodiments in accordance with the invention, velocity measurements during non-illumination intervals or during drop-outs are assumed to be constant or stops (i.e., no movement).

A drop-out occurs when the confidence level of the signal falls below a given value. Several factors can result in a poor quality signal that causes the confidence level to fall below the given value. For example, the optical navigation device may travel over a section of the surface that produces a low signal level or the movement of the navigation device causes the signal level to fluctuate wildly.

Figure 12:
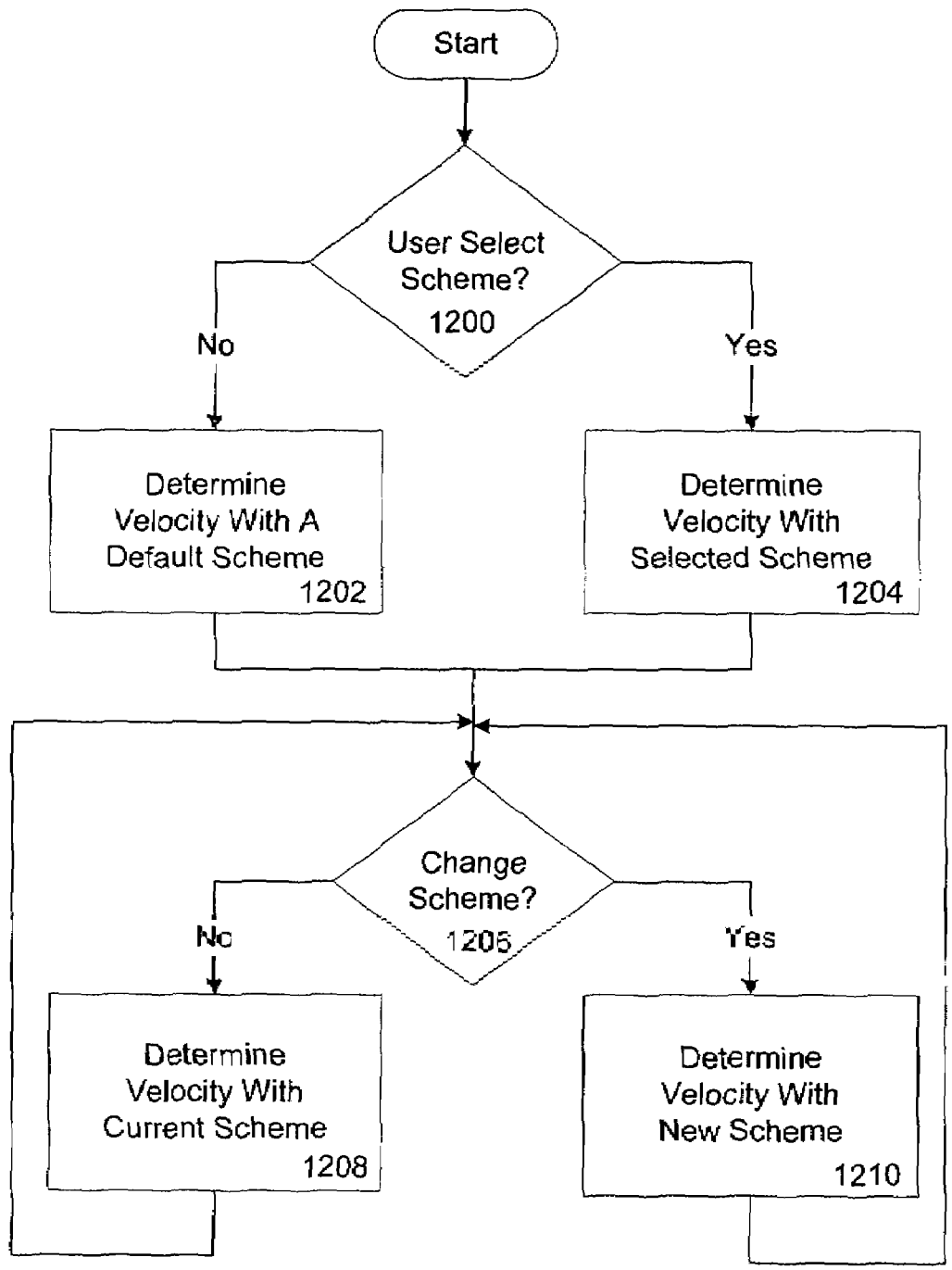
FIG. 12 is a flowchart of a method for selecting an illumination scheme in an embodiment in accordance with the invention.

Referring now to FIG. 12, there is shown a flowchart of a method for selecting an illumination scheme in an embodiment in accordance with the invention. A determination is made at block 1200 as to whether a user has selected one of the illumination schemes illustrated in FIG. 11. The user can select a scheme using one of several methods. For example, the user may select a scheme using a pull-down menu in a user interface or by a toolbar pop-up menu.

If a user has not selected a scheme, the process passes to block 1202 where the velocity measurements are made with a default scheme. The default scheme may be set, for example, by a computer or device manufacturer. If the user has selected a scheme, the process passes to block 1204 where the velocity measurements are made according to the selected scheme.

A determination is then made at block 1206 as to whether the scheme should be changed. In an embodiment in accordance with the invention, a user changes the scheme manually based on the user's preferences. In another embodiment in accordance with the invention, the scheme changes automatically based on the motion of the optical navigation device, the current confidence level in the signal, or the application in use by the user. For example, a gaming program may require a user to move the optical navigation device very quickly and in a variety of directions. A system may use an illumination scheme consistent with this type of motion. But the same user may not move the navigation device much when running a word processing program. Thus, the system can select a scheme appropriate to this level of motion. Also, the timing scheme may change when the confidence level falls below a given value. When the confidence level falls below the given value, the timing scheme may change to a scheme that has a higher number of illumination periods to allow an increase in the number of measurements.

If the scheme should not be changed, the process passes to block 1208 where the velocity measurements are obtained using the current scheme and the method returns to block 1206. If the scheme should be changed, the process continues at block 1210 where the velocity measurements are computed at the new scheme. The method then returns to block 1206.

Although the embodiments above have been described with reference to an optical navigation device, embodiments in accordance with the invention are not limited to this application. The invention may be implemented in any embodiment that determines velocity through speckle translation. Examples of other applications include, but are not limited to, other pointing devices such as trackballs and the measurement of the velocity of a surface or fluid. In addition, the speckle can be created using a coherent light source and its interaction with a rough surface or with an incoherent light on a surface that has been printed, embossed or embedded with regions that create a speckle like reflectance or transmittance.

The invention claimed is:

1. A method for determining velocity based on speckle translation, comprising:
   inputting I and Q signals into a phase quadrature decoder;
   analyzing a plurality of output pulses generated by the phase quadrature decoder;
   determining whether a pre-determined number of similarly signed output pulses are consecutively generated by the phase quadrature decoder; and
   calculating the velocity when a pre-determined number of similarly signed output pulses are consecutively generated by the phase quadrature decoder.

2. The method of claim 1, further comprising estimating the velocity with interpolation when a pre-determined number of similarly signed output pulses are not generated by the phase quadrature decoder.

3. The method of claim 1, further comprising storing at least a portion of the output pulses generated by the phase quadrature decoder.

4. The method of claim 3, further comprising:
   determining whether one or more rules should be applied to at least a portion of the stored output pulses, wherein the one or more rules define an adjustment or a control parameter for the stored output pulses; and
   if needed, applying the one or more rules to at least a portion of the stored pulses.

5. The method of claim 4, further comprising calculating the velocity after the one or more rules are applied to at least a portion of the stored pulses.

6. The method of claim 1, further comprising selecting a timing scheme that defines one or more illumination intervals and one or more non-illumination intervals.

7. The method of claim 1, further comprising:
   determining a confidence level for the velocity; and
   estimating the velocity with interpolation when the confidence level falls below a given value.

8. A system for determining velocity, comprising:
   two or more spatial filters;
   a phase quadrature decoder connected to each spatial filter; and
   a controller configured to analyze output pulses generated by the phase quadrature decoders and detect when a pre-determined number of similarly signed output pulses are consecutively generated by each phase quadrature decoder; and
   a measurement circuit configured to calculate the velocity when a pre-determined number of similarly signed output pulses are consecutively generated by the phase quadrature decoder.

9. The system of claim 8, further comprising:
   a buffer positioned between each phase quadrature decoder and the controller for storing at least a portion of the output pulses generated by each phase quadrature decoder.

10. The system of claim 9, wherein the buffer outputs one or more pulses when the controller detects a pre-determined number of similarly signed output pulses are generated by a phase quadrature decoder.

11. The system of claim 9, further comprising a memory for storing one or more rules that define an adjustment or a control parameter for the buffered output pulses, wherein the controller is configured to determine whether one or more rules should be applied to at least a portion of the buffered output pulses.

* * * * *